(12) United States Patent
Fausak et al.

(10) Patent No.: US 10,157,287 B2
(45) Date of Patent: Dec. 18, 2018

(54) SECURE ACCESS CLIENT

(71) Applicant: Wyse Technology L.L.C., San Jose, CA (US)

(72) Inventors: Andrew Fausak, San Jose, CA (US); Oleg Rombakh, Los Gatos, CA (US); James Burke, Frisco, TX (US); Darrell Testerman, McKinney, TX (US); Chris Burchett, Lewisville, TX (US); Warren Robbins, Celina, TX (US)

(73) Assignee: Wyse Technology L.L.C., Santa Clara, CA (US)

( * ) Notice: Subject to any disclaimer, the term of this patent is extended or adjusted under 35 U.S.C. 154(b) by 373 days.

(21) Appl. No.: 15/019,709

(22) Filed: Feb. 9, 2016

(65) Prior Publication Data

US 2017/0228551 A1 Aug. 10, 2017

(51) Int. Cl.
*G06F 21/53* (2013.01)
*G06F 21/62* (2013.01)
*H04L 29/06* (2006.01)
*H04L 29/08* (2006.01)

(52) U.S. Cl.
CPC ........ *G06F 21/6218* (2013.01); *G06F 21/53* (2013.01); *H04L 67/02* (2013.01); *H04L 67/141* (2013.01); *H04L 67/42* (2013.01)

(58) Field of Classification Search
CPC ..... G06F 21/6218; G06F 21/53; H04L 67/02; H04L 67/141; H04L 67/42

USPC .......................................................... 726/30
See application file for complete search history.

(56) References Cited

U.S. PATENT DOCUMENTS

| | | | | |
|---|---|---|---|---|
| 8,950,005 | B1 * | 2/2015 | Torney | G06F 21/629 |
| | | | | 713/193 |
| 2007/0233869 | A1 * | 10/2007 | Jodh | H04L 63/10 |
| | | | | 709/226 |
| 2010/0146127 | A1 * | 6/2010 | Schmieder | G06F 9/545 |
| | | | | 709/228 |

* cited by examiner

*Primary Examiner* — Eleni A Shiferaw
*Assistant Examiner* — Angela R Holmes
(74) *Attorney, Agent, or Firm* — Kirton McConkie; Brian Tucker (57) ABSTRACT

A secure access client can be employed to enforce limitations on a user's access to a file while also allowing the user to access the file using an application of choice. To provide this functionality, the secure access client can implement an RDP client that is configured to create an RDP session with an RDP service executing on the same computing device. The RDP service can allow the secure access client to display the user interface of an application employed to open a file. The secure access client can be configured to selectively apply access limitations on a per file basis. This selective enforcement can be accomplished by only implementing a virtual channel extension to provide a particular type of access to the file when the file's access limitations would allow such access.

19 Claims, 9 Drawing Sheets

SECURE ACCESS CLIENT

CROSS-REFERENCE TO RELATED APPLICATIONS

N/A

BACKGROUND

There are currently various products that can be employed to secure access to data. For example, Dell Credant is a technology that can be employed to ensure that only specified users can access data and that such access conforms to specified limitations such as by preventing a user from using copy and paste functionality when viewing a particular document. However, to enforce these limitations, the current products will only allow the data to be accessed within customized applications that are configured to prevent the data from being saved, copied, or otherwise shared. From the user's perspective, these products are therefore undesirable because the user does not have the ability to access the data from an application of choice. For example, with these products, the user typically would not be able to open a word processing document using Microsoft Word, but would be required to employ a customized word processing application that does not implement copy and paste, save, or other functionality that may allow the content of the document to become improperly accessible. In addition to this burden on the user, there is also a burden on the developers to create these custom applications that can be used to implement the specified limitations on user access.

Native Client is a technology for running native complied code in a browser. For example, Native Client can allow an application written in C or C++ to be compiled, linked, targeted, and executed within the browser environment. To enable this, Native Client includes a toolchain (i.e., a compiler, a linker, an assembler, etc.) that are used to convert native source code into a module that can be executed within the browser. The Native Client toolchain can produce non-portable modules (referred to as nexe modules) which are architecture dependent or portable modules (referred to as PNaCl or pexe modules) which are not.

BRIEF SUMMARY

The present invention extends to methods, systems, and computer program products for implementing a secure access client that can be employed to enforce limitations on a user's access to a file while also allowing the user to access the file using an application of choice. In other words, the present invention can allow the user to open a file in a manner that, from the user's perspective, may appear to be standard while still enforcing any access limitations that may have been defined for the file.

To provide this functionality, the present invention can implement a secure access client that is executed within a browser sandbox such as, for example, as a pNaCl module. The secure access client can implement an RDP client that is configured to create an RDP session with an RDP service executing on the same computing device. The RDP service can allow the secure access client to display the user interface of an application employed to open a file. The secure access client can be configured to selectively apply access limitations on a per file basis. This selective enforcement can be accomplished by only implementing a virtual channel extension to provide a particular type of access to the file when the file's access limitations would allow such access.

In some embodiments, the present invention is implemented as a method for applying access limitations on a per file basis. An RDP service that is configured to establish RDP sessions with RDP clients can be executed. A secure access client that implements an RDP client can be executed within a browser sandbox on a computing device. An RDP session can be established between the RDP service and the secure access client. A file can be opened via the RDP session. In conjunction with opening the file, the secure access client can identify one or more access limitations defined for the file. While the file is open, the secure access client can identify that a user has provided input that has initiated an action that if completed would violate the one or more access limitations. The secure access client can then prevent the action from being completed thereby ensuring that the one or more access limitations are not violated.

In other embodiments, the present invention is implemented as one or more computer storage media storing computer executable instructions which define: an RDP service that is configured to establish RDP sessions with RDP clients; and a secure access client that is configured to implement an RDP client for establishing RDP sessions with the RDP service. The secure access client is further configured to selectively apply access limitations to files that are opened via an RDP session with the RDP service such that the access limitations are applied on a per file basis.

In other embodiments, the present invention is implemented as a system comprising one or more processors; and computer storage media storing computer executable instructions which when executed by the one or more processors implement a method for applying access limitations on a per file basis, the method comprising: executing an RDP service that is configured to establish RDP sessions with RDP clients; executing a secure access client that implements an RDP client; establishing, via a localhost connection, an RDP session between the RDP service and the secure access client; opening a file via the RDP session such that the file is opened by an application that is executing within an RDP session environment; in conjunction with opening the file, identifying, by the secure access client, one or more access limitations defined for the file; and while the file is open, selectively enabling access to the file in accordance with access limitations defined for the file such that the secure access client enforces access limitations on a per file basis.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
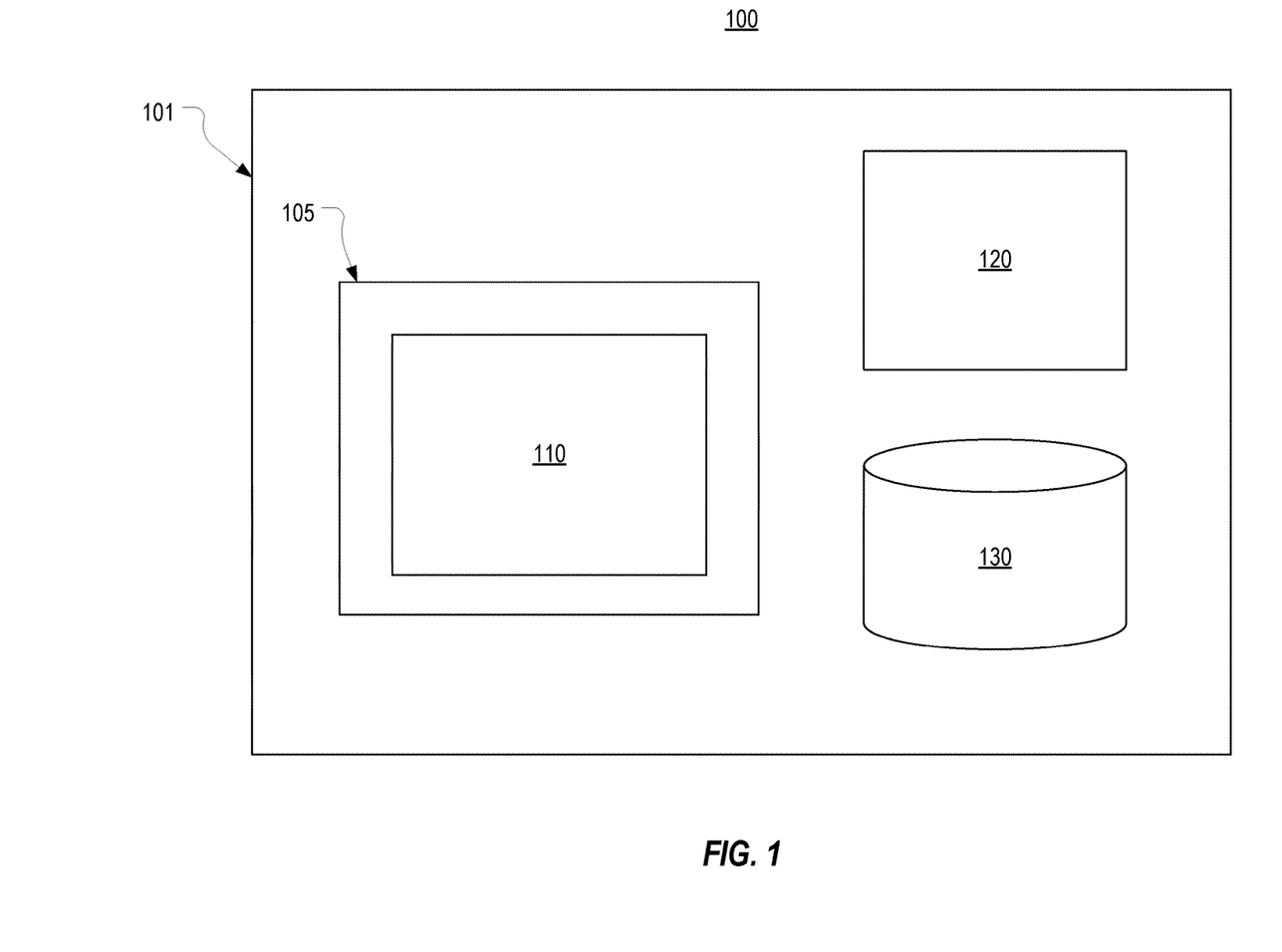
FIG. 1 illustrates an example computing environment in which the present invention may be implemented.

FIG. 1 illustrates an example computing environment 100 in which the present invention can be implemented. Computing environment 100 includes a computing device 101 which may typically be a client device such as a desktop computer, a laptop, a tablet, a mobile phone or other mobile device, etc. However, computing device 101 may represent any type of computing device having an operating system that is capable of executing a browser.

Computing device 101 is shown as including a browser 105, an RDP service 120, and storage 130. Although this specification will describe embodiments that employ Native Client, which is a sandbox environment provided by Google for use within the Google Chrome browser, the present invention may equally be implemented with other browsers that provide a sandbox environment for executing native code within the browser. Accordingly, browser 105 is shown as including a secure access client 110 which can be a Native Client module that is executed by browser 105 within the Native Client sandbox.

RDP service 120 can represent any service that implements the Remote Desktop Protocol or other similar remote display protocol. Therefore the term "RDP" should be construed generally as encompassing the Remote Desktop Protocol, but should not be limited only to the Remote Desktop Protocol. For example, the present invention could equally be implemented in cases where RDP service 120 employs Citrix's Independent Computing Architecture ("ICA"). RDP service 120 can be configured to listen for requests from RDP clients to establish RDP sessions. These RDP sessions can include instances where an entire desktop is remoted to the RDP client as well as instances where only a single application is remoted. Storage 130 is intended to generally represent any type of storage device that may be accessible from computing device 101.

Figure 2:
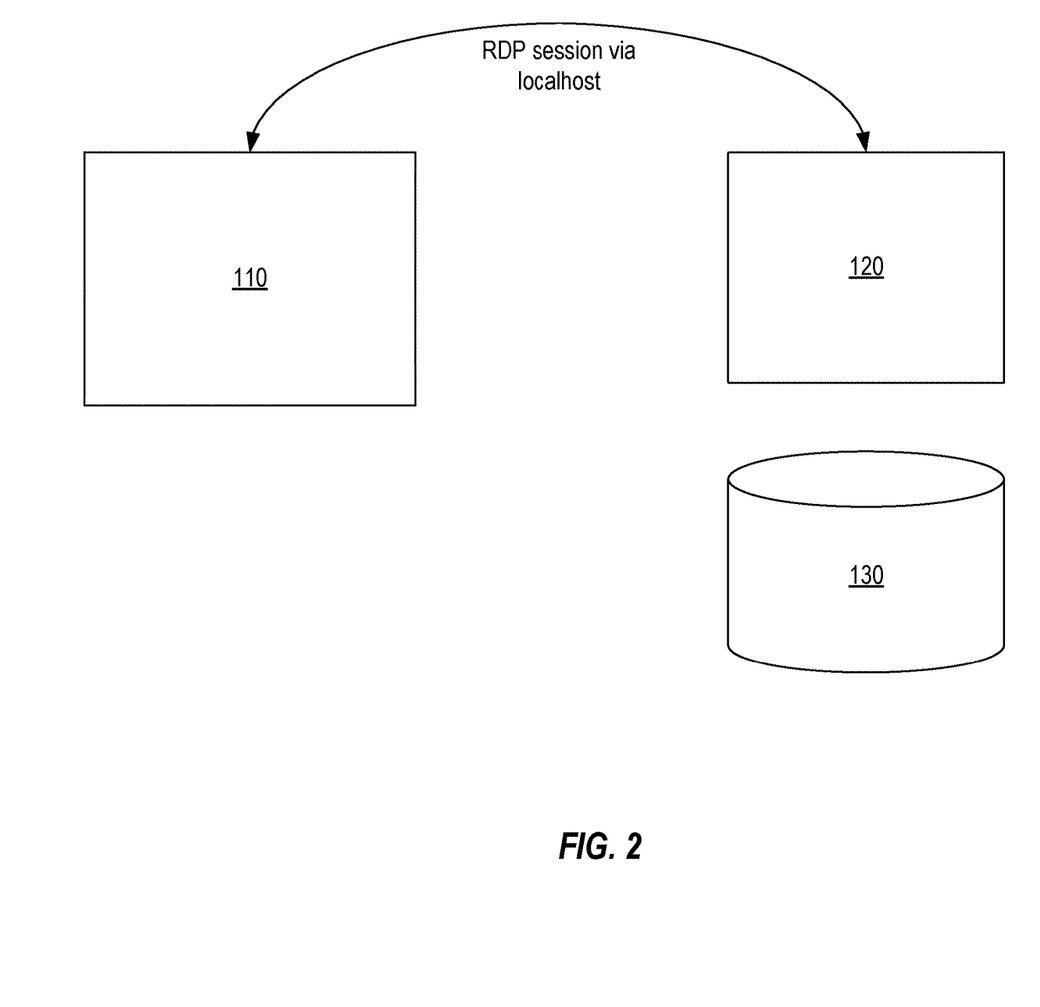
FIG. 2 illustrates an example of how a secure access client can establish an RDP session with an RDP service executing on the same computing device.

FIG. 2 provides a general overview of how RDP service 120 may allow secure access client 110 to establish an RDP session for the purpose of accessing a file stored on storage 130. In FIG. 2, browser 105 is not depicted. However, it should be understood that secure access client 110 is executed within browser 105 and employs the conventions of the browser's sandbox to perform the functionality described as follows.

Because secure access client 110 and RDP service 120 are operating on the same computing device 101, secure access client 110 can employ localhost to establish an RDP session with RDP service 120. In other words, secure access client 110 implements an RDP client to allow secure access client 110 to establish RDP sessions with RDP service 120.

As is known in the art, once an RDP session is established, RDP service 120 could allow secure access client 110 (or any other RDP client) to access files stored in storage 130 by opening such files with an appropriate application and redirecting the application's display output over the RDP session to secure access client 110. Typical RDP techniques would also allow copy and paste and file transfer functionality. However, providing access to files in this standard RDP manner would allow the user to have full access to the contents of the file. Therefore, in accordance with embodiments of the present invention, RDP service 120 and secure access client 110 can be configured to allow access to files stored in storage 130 only in accordance with defined limitations. In other words, both RDP service 120 and secure access client 110 can be configured to implement functionality to selectively limit the type of access a user will have to files stored in storage 130.

Figure 3A:
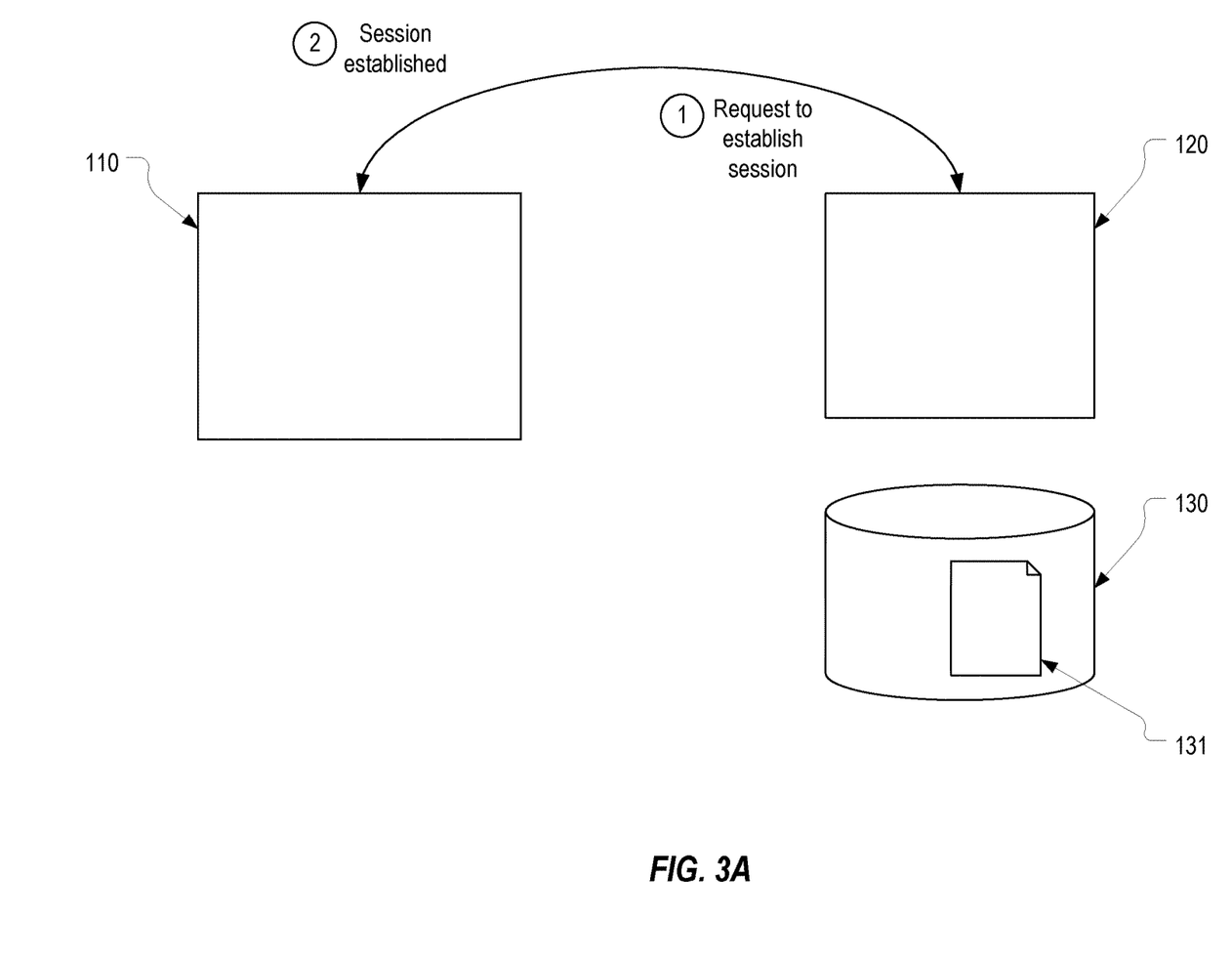
FIGS. 3A-3C provide an example of how a secure access client can allow a file to be opened.
Figure 3B:
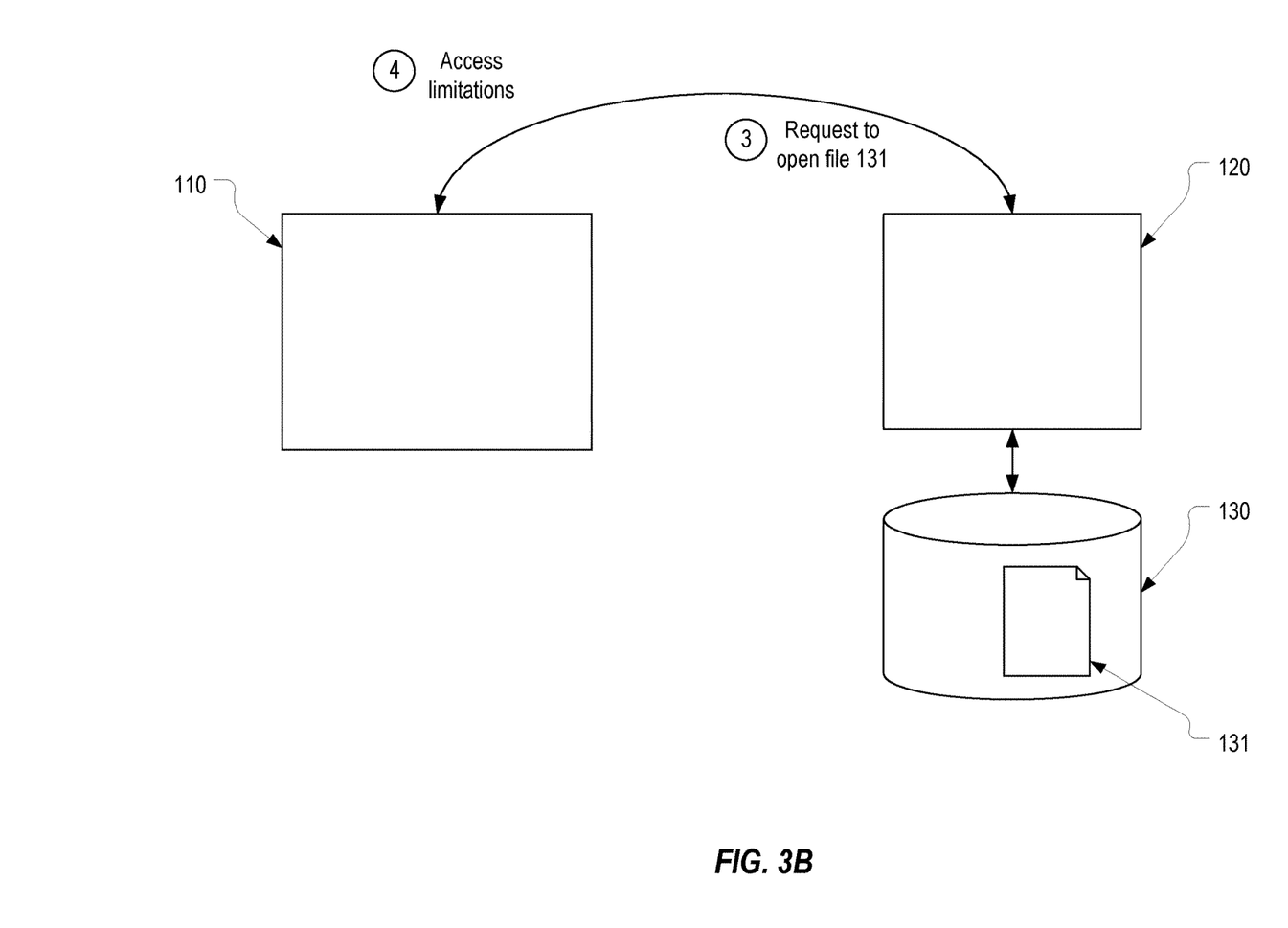
Figure 3C:
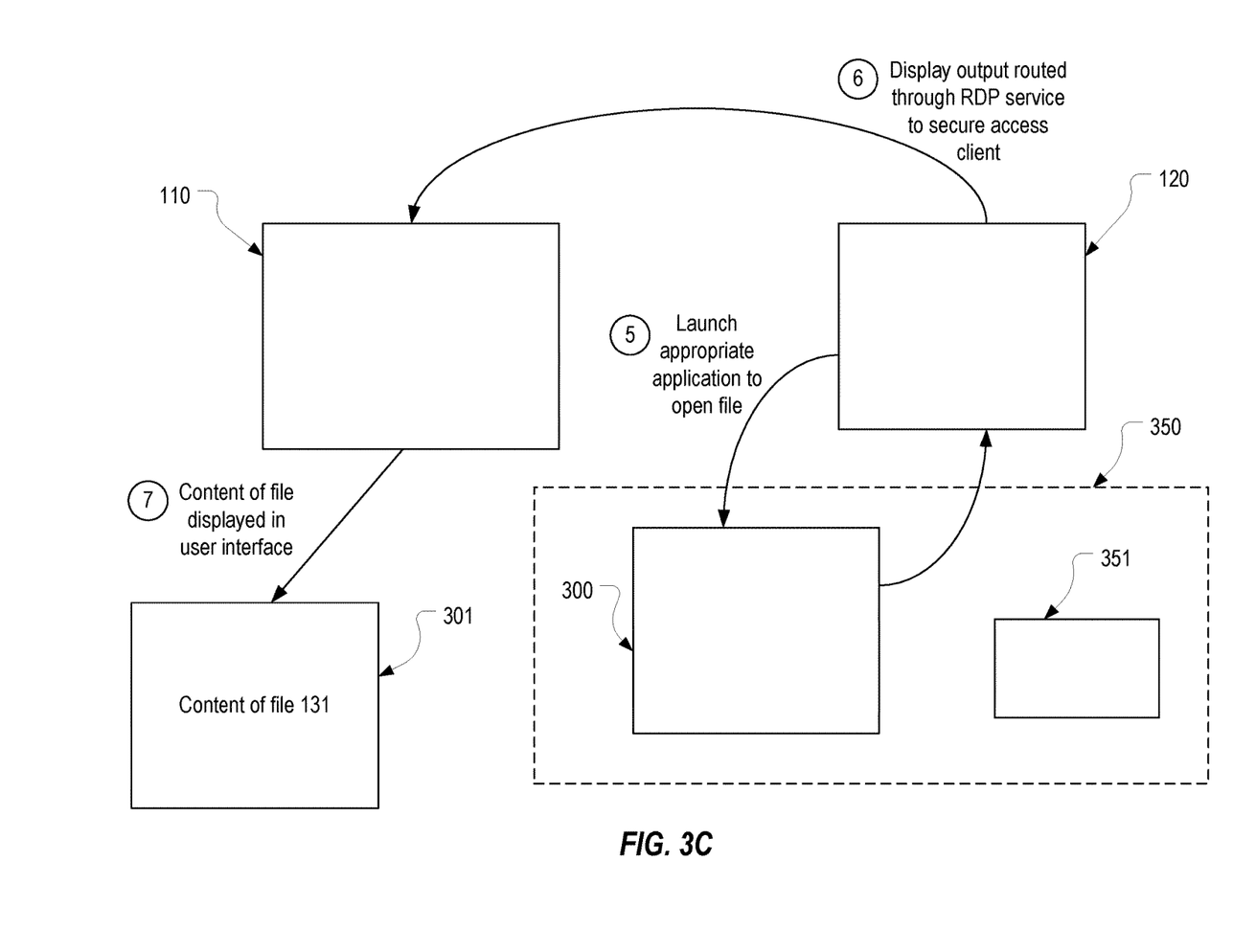

FIGS. 3A-3C illustrate how secure access client 110 and RDP service 120 can operate to selectively limit the type of access to a particular file 131 that is stored in storage 130. In this example, it will be assumed that the user has selected file 131 (e.g., by double clicking on an icon representing the file). In response to the selection of file 131, secure access client 110 can be launched (unless it is already executing). To cause this to happen, computing device 100 may be configured to associate particular file types with secure access client 110 so that secure access client 110 is launched when the particular type of files are selected. As an example, computing device 100 can be configured to associate Microsoft Word documents with secure access client 110 so that the operating system on computing device 100 causes secure access client 110 rather than Microsoft Word to be launched when the user selects a Word document. Alternatively, the user may be required to establish an RDP session prior to selecting to access a document.

Once secure access client 110 is launched, it can employ RDP (or another similar remote display protocol) to request the establishment of a session with RDP service 120 as indicated by step 1 in FIG. 3A. As part of this step, secure access client 110 can provide appropriate credentials or other identifier to RDP service 120 to indicate that it is a secure access client. In other words, RDP service 120 can verify whether an RDP client requesting a session is a secure access client before establishing a session with the RDP client. This may be necessary in some embodiments to ensure that an RDP client that is not a secure access client (e.g., a typical RDP client) is unable to obtain access to files. In this case, because the request is received from secure access client 110, RDP service 120 can approve the request and establish a session in step 2. As indicated above, if secure access client 110 were already executing when the user selected file 131, steps 1 and 2 may have already been performed.

Once the session is established, secure access client 110 can communicate with RDP service 120 using the conventions of RDP. In accordance with the current example, these communications can include an indication that the user has selected to open file 131 in step 3 as shown in FIG. 3B. In response, RDP service 120 can access file 131 and determine whether any access limitations are specified for file 131. For example, one or more headers of file 131, one or more associated hidden files, or other associated structure (e.g., a structure maintained by RDP service 120) may define access limitations for file 131. Therefore, upon detecting the defined access limitations for file 131, RDP service 120 can inform secure access client 110 accordingly in step 4.

Once secure access client 110 knows which access limitations apply to file 131, the user can be allowed to view file 131. Accordingly, FIG. 3C illustrates that, in step 5, RDP service 120 launches the appropriate application 300 to open file 131. For example, if file 131 is a Word document, RDP service 120 may launch Microsoft Word to open file 131. It is noted that, even though RDP service 120 is operating on the same computing device 101 as secure access client 110, application 300 is launched within an RDP session environment 350 (e.g., a virtual machine). RDP session environment 350 will include its own clipboard 351 which is separate from the standard clipboard provided by the operating system on computing device 101. Also, because application 300 is launched in RDP session environment 350, its user interface will be redirected in accordance with RDP conventions through RDP service 120 to secure access client 110 (or more particularly, to the RDP client portion of secure access client 110) as shown in step 6. In step 7, secure access client 110 can cause an appropriate user interface 301 to be generated for displaying the display output of application 300 (which in this case would include the content of file 131) using RDP conventions. Because secure access client 110 is executed within browser 105, user interface 301 will actually be a window of browser 105. Step 7 can be accomplished using any known RDP technique. For example, as indicated above, user interface 301 could be displayed as part of a remoted desktop. However, in some embodiments, user interface 301 could be generated using Microsoft's RemoteApp technology (or other similar technology) so that it appears that application 300 is executing locally (i.e., not within RDP session environment 350).

At this point, the user is able to view file 131 in what may appear to be a typical manner. However, because file 131 is being accessed via secure access client 110, the access limitations specified in step 4 can be enforced. For example, because secure access client 110 functions as an RDP client to present user interface 301 of application 300 to the user, secure access client 110 can control whether copy and paste functionality will be provided when viewing a particular file. It is emphasized that the present invention allows such limitations to be enforced on a per file basis.

To better illustrate how the present invention can allow access limitations to be selectively applied on a per file basis, an example in which copy and paste functionality is allowed will first be provided. As indicated above, regardless of which access limitations are specified for a particular file, the appropriate access limitations can be provided to secure access client 110 to allow secure access client 110 to enforce the restrictions.

Figure 4A:
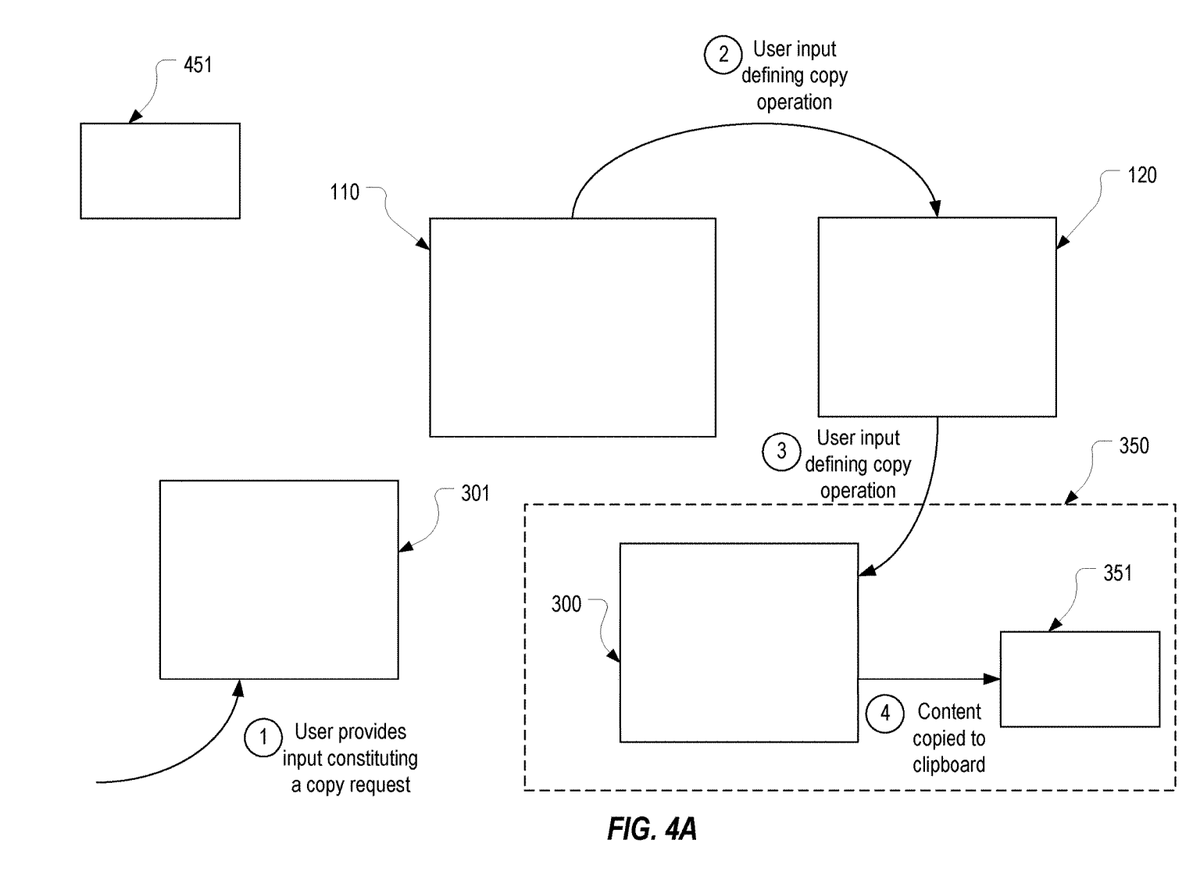
FIGS. 4A-4C provide examples of how a secure access client can selectively apply access limitations on a per file basis.
Figure 4B:
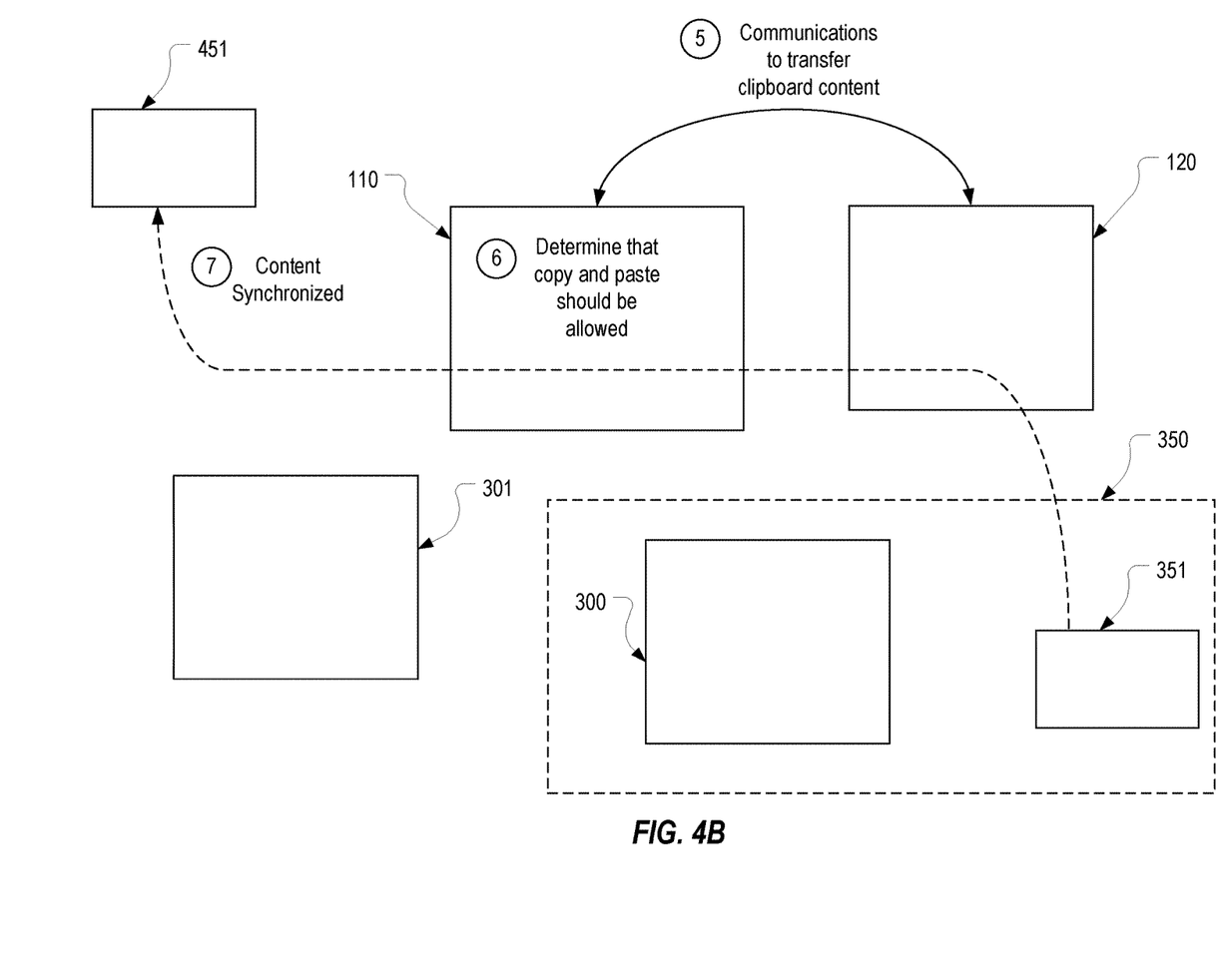

FIGS. 4A and 4B illustrate the case where the access limitations defined for file 131 indicate that copy and paste is allowed. In FIG. 4A and in step 1, it will be assumed that the user has selected a portion of the content of file 131 and has specified a copy operation (e.g., by pressing CTRL-C). Because user interface 301 is "owned" by secure access client 110, the operating system will route this user input to secure access client 110 (via browser 105). Then, in step 2, secure access client 110, as an RDP client, will cause the user input to be passed on to RDP service 120 using RDP conventions. In step 3, RDP service 120 would then pass this input on to application 300 also using RDP conventions. In step 4, application 300 would respond to the input by copying the selected content to clipboard 351. Accordingly, steps 1-4 are implemented in a typical RDP fashion.

As is known in the art, the RDP protocol can allow the contents of clipboard 351 to be synchronized to the local clipboard—i.e., the clipboard directly accessible to the RDP client. FIG. 4A therefore depicts a local clipboard 451 which would be the standard clipboard provided by the operating system on computing device 101. It is important to distinguish between clipboard 351 and clipboard 451 since clipboard 351 exists within RDP session environment 350 and would therefore only be accessible to applications executing within RDP session environment 350. As is known in the art, the RDP: Clipboard Virtual Channel Extension (or other similar protocol extension) could be employed to synchronize clipboard 351 and clipboard 451.

RDP service 120 can be configured to synchronize clipboard 351 and clipboard 451 so that copy and paste functionality can be provided when the access limitations for the file would allow it. Therefore, FIG. 4B includes a step 5 depicting various communications between RDP service 120 and secure access client 110 which can be performed to initiate the synchronization of clipboard 351 and clipboard 451. For example, these communications can conform to the RDP: Clipboard Virtual Channel Extension.

In step 6, secure access client 110 evaluates the access limitations for file 131 to determine whether copy and paste functionality should be provided. In this case, since it is assumed that the access limitations define that copy and paste functionality should be provided, in step 7, secure access client 110 can allow the content from clipboard 351 to be synchronized to clipboard 451 (e.g., by implementing the techniques of the RDP: Clipboard Virtual Channel Extension to retrieve the content from clipboard 351 and by employing the Native Client API to write the content to clipboard 451). Once the content is synchronized to clipboard 451, it can be pasted into any local application as is standard in the art.

Figure 4C:
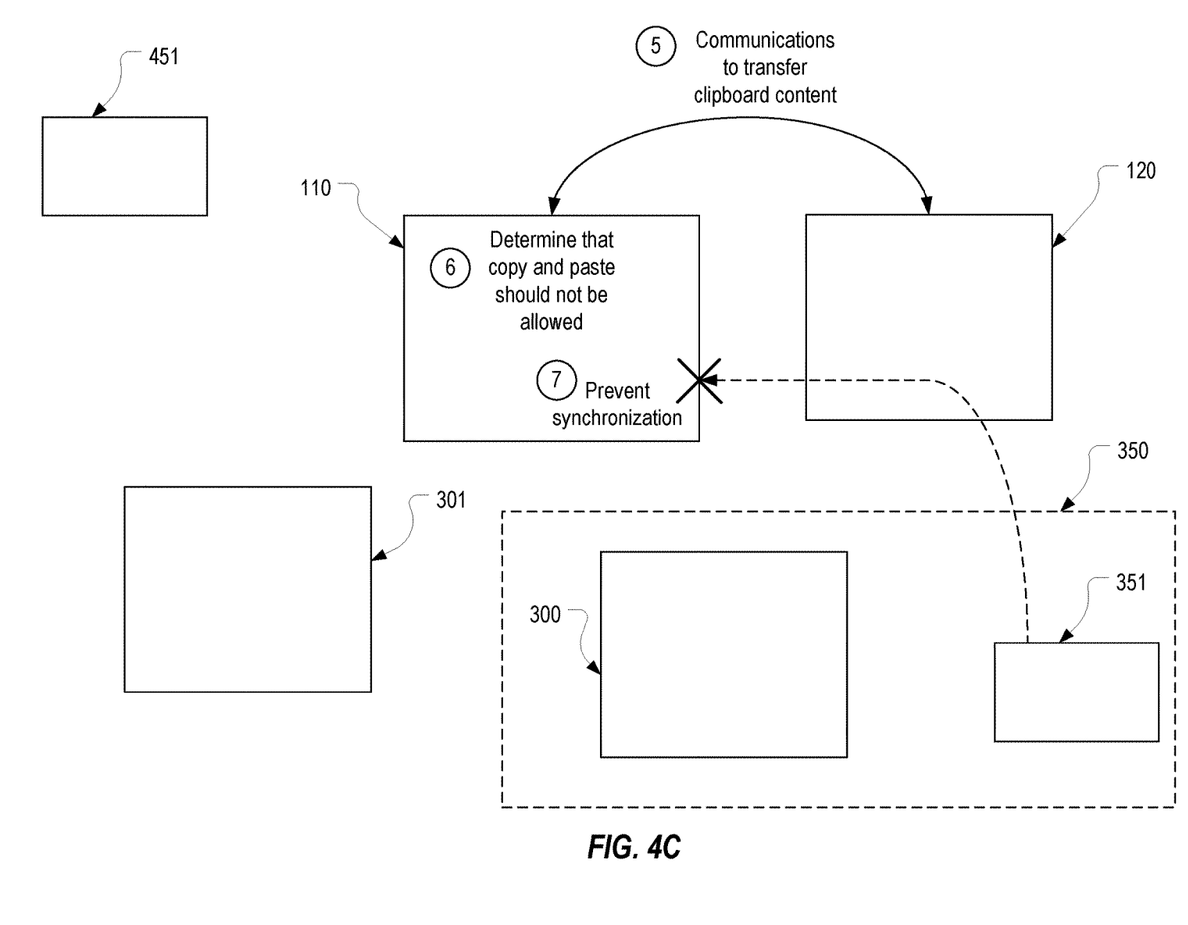

In contrast to FIG. 4B, FIG. 4C depicts the case where the access limitations for file 131 indicate that copy and paste should not be allowed. In this case, steps 1-5 would be performed in a similar manner. However, in step 6, secure access client 110 will determine that the access limitations for file 131 indicate that copy and paste functionality should not be provided. Accordingly, in step 7, secure access client 110 will prevent the synchronization of clipboard 351 with clipboard 451. As a result, the content of file 131 which was copied to clipboard 351 in response to the user input will never appear in clipboard 451 and will therefore not be accessible to the user. This step of preventing synchronization could be performed in a number of different manners. For example, in embodiments where the RDP: Clipboard Virtual Channel Extension is employed, secure access client 110 may fail to update clipboard 451 in response to a Format_List_PDU received from RDP service 120.

Although this selective enforcement of access limitations has been described with reference to copy and paste functionality, similar steps would be followed to implement other types of access limitations. For example, secure access client 110 could selectively implement portions of the RDP: File System Virtual Channel Extension and the RDP: Print Virtual Channel Extension to enable the user to save and print a file respectively only when the access limitations would allow it. Of course, secure access client 110 could also be configured to selectively enforce other types of access limitations using techniques suitable for the specific remote display protocol employed.

In summary, secure access client 110 can be configured to provide certain access features to a file only when the file's access limitations dictate that such access features should be enabled. The present invention therefore provides a very granular level of control over the type of access a user will have to individual files. By enforcing these access limitations at the RDP client side, the present invention allows the enforcement to be selectively applied on a per file basis. Also, the present invention allows the file to be opened with any suitable application that the user may desire to use while still ensuring that access limitations will not be violated.

It is important to note that current RDP techniques allow access limitations to be applied on a per session basis. For example, when a user logs in to an RDP session, a group policy applicable to that user may indicate that clipboard synchronization should not be provided. In such cases, RDP service 120 would simply not implement the RDP: Clipboard Virtual Channel Extension so that no copy and paste functionality would be provided regardless of which file was opened. In other words, current RDP techniques only provide an all or nothing approach which is dictated at the RDP service side. In contrast, the present invention would allow the RDP service to always implement clipboard synchronization so that the secure access client can determine whether to allow copy and paste functionality (or other similar types of access) on a per file basis.

In some embodiments, RDP service 120 can be configured to allow an administrator to remotely specify and/or update access limitations for particular files. For example, if file 131 included access limitations that allowed copy and paste functionality and the administrator desired to remove this functionality, he or she could establish an RDP session with RDP service 120 and update the access limitations for file 131 accordingly (e.g., by updating a header, associated file, or data structure where the access limitations are defined).

To ensure that files that are subject to access limitations cannot be accessed outside of the techniques of the present invention, such files, including their associated access limitations, can be encrypted or otherwise secured. In such cases, RDP service 120 can include functionality for decrypting a file to allow the file to be opened by the appropriate application within the RDP session environment.

Although the specification has described embodiments where secure access client 110 and RDP service 120 are operating on the same computing device 101, the present invention can equally be implemented when RDP service 120 is executing on a separate computing device (e.g., a server). In such cases, secure access client 110 can perform the same steps as described above to selectively apply access limitations on a per file basis when the file is stored remotely.

Figure 5:
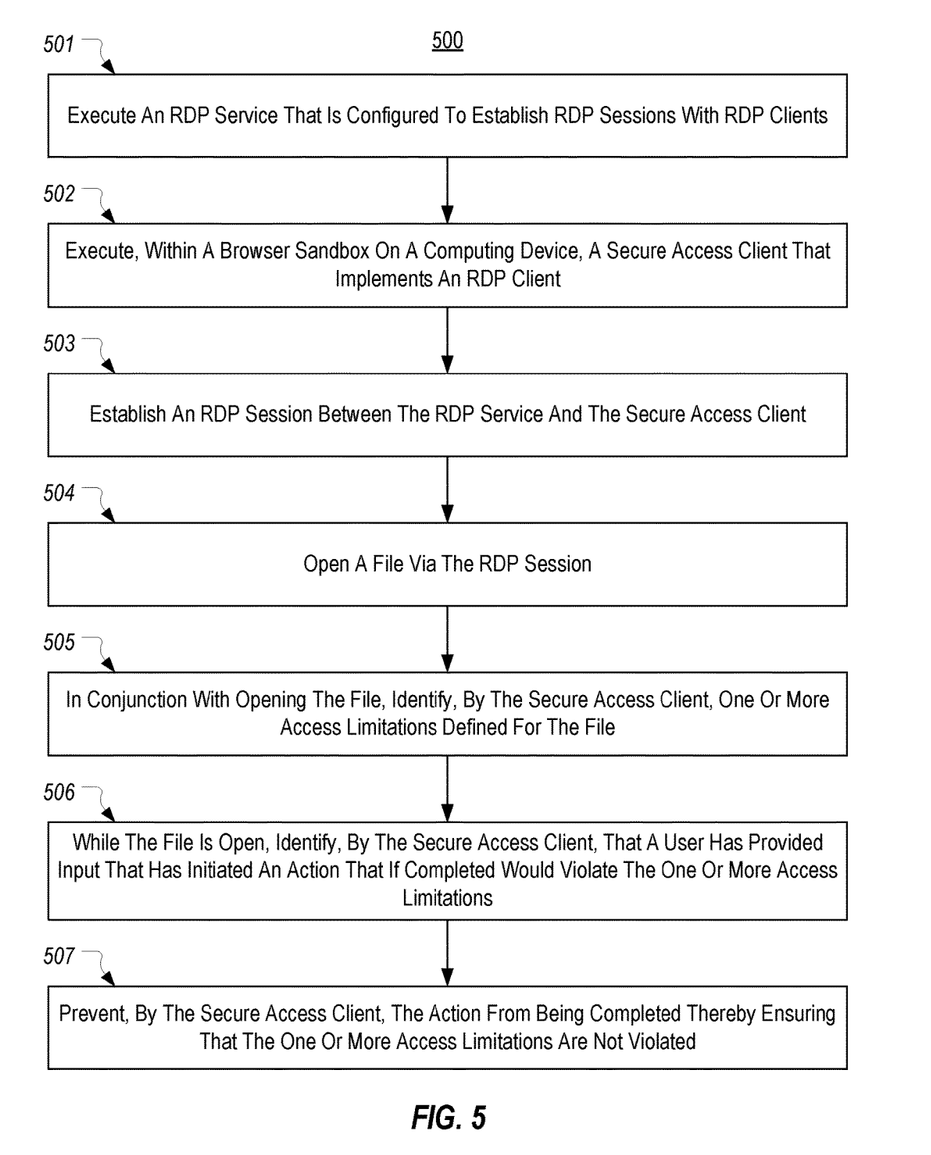
FIG. 5 illustrates a flowchart of a method for applying access limitations on a per file basis.

FIG. 5 illustrates a flowchart of an example method 500 for applying access limitations on a per file basis. Method 500 will be described with reference to figures to provide context but should not be limited to the specific examples shown in the figures.

Method 500 includes an act 501 of executing an RDP service that is configured to establish RDP sessions with RDP clients. For example, RDP service 120 can be executed.

Method 500 includes an act 502 of executing, within a browser sandbox on a computing device, a secure access client that implements an RDP client. For example, secure access client 110 can be executed within a sandbox in browser 105.

Method 500 includes an act 503 of establishing an RDP session between the RDP service and the secure access client. For example, secure access client 110 can establish an RDP session with RDP service 120 using the Remote Desktop Protocol or any other suitable remote display protocol.

Method 500 includes an act 504 of opening a file via the RDP session. For example, file 131 can be opened by application 300 which is executing within RDP session environment 350.

Method 500 includes an act 505 of, in conjunction with opening the file, identifying, by the secure access client, one or more access limitations defined for the file. For example, secure access client 110 can receive one or more access limitations pertaining to file 131 from RDP service 120.

Method 500 includes an act 506 of, while the file is open, identifying, by the secure access client, that a user has provided input that has initiated an action that if completed would violate the one or more access limitations. For example, secure access client 110 could detect that RDP service 120 is attempting synchronize the contents of clipboard 351 to clipboard 451.

Method 500 includes an act 507 of preventing, by the secure access client, the action from being completed thereby ensuring that the one or more access limitations are not violated. For example, secure access client 110 can fail to perform the steps necessary to synchronize the content of clipboard 351 to clipboard 451.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for applying access limitations on a per file basis, the method comprising:
   executing a remote display protocol (RDP) service that is configured to establish RDP sessions with RDP clients;
   executing, within a browser sandbox on a computing device, a secure access client that implements an RDP client;
   establishing an RDP session between the RDP service and the secure access client;
   opening a file via the RDP session including displaying, by the secure access client, contents of the file to a user of the computing device;
   in conjunction with opening the file, identifying, by the secure access client, one or more access limitations defined for the file, the one or more access limitations comprising a copy limitation;
   while the file is open, identifying, by the secure access client, that the user has provided input to the computing device that has initiated an action that if completed would violate the one or more access limitations defined for the file; and
   preventing, by the secure access client, the action from being completed by selectively failing to implement functionality of a virtual channel extension of the RDP session thereby ensuring that the one or more access limitations defined for the file are not violated;
   wherein selectively failing to implement functionality of the virtual channel extension of the RDP session comprises failing to synchronize contents of a clipboard in an RDP session environment to a clipboard of the computing device.

2. The method of claim 1, further comprising:
   opening a second file via the RDP session;
   in conjunction with opening the second file, identifying, by the secure access client, that one or more access limitations defined for the second file do not include a copy limitation;
   while the file is open, identifying, by the secure access client, that a user has provided input that has initiated a copy action; and
   implementing, by the secure access client, the copy action by implementing functionality of the virtual channel extension of the RDP session to cause synchronization of contents of the clipboard in the RDP session environment to the clipboard of the computing device.

3. The method of claim 2, wherein implementing functionality of the virtual channel extension of the RDP session comprises implementing the RDP: Clipboard Virtual Channel Extension such that the secure access client selectively implements the RDP: Clipboard Virtual Channel Extension on a per file basis depending on the access limitations defined for the particular file.

4. The method of claim 1, wherein the one or more access limitations also comprise a save limitation and selectively failing to implement functionality of the virtual channel extension of the RDP session comprises failing to save the file to a location outside an RDP session environment.

5. The method of claim 4, further comprising:
   opening a second file via the RDP session;
   in conjunction with opening the second file, identifying, by the secure access client, that one or more access limitations defined for the second file do not include a save limitation;
   while the file is open, identifying, by the secure access client, that a user has provided input that has initiated a save action; and
   implementing, by the secure access client, the save action by implementing functionality of the virtual channel extension of the RDP session to cause the file to be saved outside the RDP session environment.

6. The method of claim 5, wherein implementing functionality of the virtual channel extension of the RDP session comprises implementing the RDP: File System Virtual Channel Extension such that the secure access client selectively implements the RDP: File System Virtual Channel Extension on a per file basis depending on the access limitations defined for the particular file.

7. The method of claim 1, wherein the one or more access limitations also comprise a print limitation and selectively failing to implement functionality of the virtual channel extension of the RDP session comprises failing to print the file to a printer accessible outside an RDP session environment.

8. The method of claim 7, further comprising:
   opening a second file via the RDP session;
   in conjunction with opening the second file, identifying, by the secure access client, that one or more access limitations defined for the second file do not include a print limitation;
   while the file is open, identifying, by the secure access client, that a user has provided input that has initiated a print action; and
   implementing, by the secure access client, the print action by implementing functionality of the virtual channel extension of the RDP session to cause the file to be printed to a printer accessible outside the RDP session environment.

9. The method of claim 8, wherein implementing functionality of the virtual channel extension of the RDP session comprises implementing the RDP: Print Virtual Channel Extension such that the secure access client selectively implements the RDP: Print Virtual Channel Extension on a per file basis depending on the access limitations defined for the particular file.

10. The method of claim 1, wherein the RDP service is executed on the computing device such that the RDP session is established via localhost.

11. The method of claim 1, further comprising:
    establishing an RDP session between the RDP service and an administer device;
    receiving, from the administrator device and via the RDP session, updates to access limitations defined for one or more files; and
    modifying the access limitations defined for the one or more files in accordance with the received updates.

12. The method of claim 1, wherein the access limitations are stored as one or more of:
    one or more headers to the file to which the access limitations pertain;
    one or more files associated with the file to which the access limitations pertain; or
    one or more data structures maintained by the RDP service for defining the access limitations for the files to which the RDP service provides access.

13. One or more computer storage media storing computer executable instructions which when executed by one or more processors implement a method comprising:
    executing, within a browser sandbox on a computing device, a secure access client that implements a remote display protocol (RDP) client;
    establishing an RDP session between the secure access client and an RDP service;

opening a file via the RDP session including displaying, by the secure access client, contents of the file to a user of the computing device;

in conjunction with opening the file, identifying, by the secure access client, one or more access limitations defined for the file, the one or more access limitations comprising a copy limitation;

while the file is open, identifying, by the secure access client, that the user has provided input to the computing device that has initiated an action that if completed would violate the one or more access limitations defined for the file; and preventing, by the secure access client, the action from being completed by selectively failing to implement functionality of a virtual channel extension of the RDP session thereby ensuring that the one or more access limitations defined for the file are not violated;

wherein selectively failing to implement functionality of the virtual channel extension of the RDP session comprises failing to synchronize contents of a clipboard in an RDP session environment to a clipboard of the computing device.

14. The computer storage media of claim 13, wherein implementing functionality of the virtual channel extension of the RDP session comprises implementing the RDP: Clipboard Virtual Channel Extension such that the secure access client selectively implements the RDP: Clipboard Virtual Channel Extension on a per file basis depending on the access limitations defined for the particular file.

15. The computer storage media of claim 13, wherein implementing functionality of the virtual channel extension of the RDP session comprises implementing the RDP: File System Virtual Channel Extension such that the secure access client selectively implements the RDP: File System Virtual Channel Extension on a per file basis depending on the access limitations defined for the particular file.

16. The computer storage media of claim 13, wherein implementing functionality of the virtual channel extension of the RDP session comprises implementing the RDP: Print Virtual Channel Extension such that the secure access client selectively implements the RDP: Print Virtual Channel Extension on a per file basis depending on the access limitations defined for the particular file.

17. A system comprising:
one or more processors; and
computer storage media storing computer executable instructions which when executed by the one or more processors implement a method for applying access limitations on a per file basis, the method comprising:

executing, within a browser sandbox on a computing device, a secure access client that implements a remote display protocol (RDP) client;

establishing an RDP session between the secure access client and an RDP service;

opening a file via the RDP session including displaying, by the secure access client, contents of the file to a user of the computing device;

in conjunction with opening the file, identifying, by the secure access client, one or more access limitations defined for the file, the one or more access limitations comprising a copy limitation;

while the file is open, identifying, by the secure access client, that the user has provided input to the computing device that has initiated an action that if completed would violate the one or more access limitations defined for the file; and preventing, by the secure access client, the action from being completed by selectively failing to implement functionality of a virtual channel extension of the RDP session thereby ensuring that the one or more access limitations defined for the file are not violated;

wherein selectively failing to implement functionality of the virtual channel extension of the RDP session comprises failing to synchronize contents of a clipboard in an RDP session environment to a clipboard of the computing device.

18. The system of claim 17, wherein the access limitations that are selectively enforced also include one or more of save access or print access.

19. The system of claim 17, wherein the virtual channel extension comprises one of:
the RDP: Clipboard Virtual Channel Extension;
the RDP: Print Virtual Channel Extension; or
the RDP: File System Virtual Channel Extension.

* * * * *